United States Patent
Adams

(10) Patent No.: US 8,510,663 B2
(45) Date of Patent: Aug. 13, 2013

(54) MULTIPLE APPLICATION COORDINATION OF THE DATA UPDATE RATE FOR A SHARED RESOURCE

(75) Inventor: James Adams, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 510 days.

(21) Appl. No.: 12/763,282

(22) Filed: Apr. 20, 2010

(65) Prior Publication Data

US 2011/0258574 A1 Oct. 20, 2011

(51) Int. Cl.
*G06F 9/46* (2006.01)
*G06F 3/048* (2013.01)

(52) U.S. Cl.
USPC .......................................... 715/751; 718/104

(58) Field of Classification Search
None
See application file for complete search history.

(56) References Cited

U.S. PATENT DOCUMENTS

| | | | |
|---|---|---|---|
| 5,734,380 A | 3/1998 | Adams et al. | |
| 5,796,403 A | 8/1998 | Adams et al. | |
| 6,529,970 B1 * | 3/2003 | Sarpangal | 710/33 |
| 6,680,677 B1 * | 1/2004 | Tiphane | 341/22 |
| 7,139,623 B2 | 11/2006 | Adams et al. | |
| 2005/0149258 A1 * | 7/2005 | Gargi | 701/208 |
| 2006/0129944 A1 * | 6/2006 | Berquist et al. | 715/764 |
| 2007/0079252 A1 * | 4/2007 | Ramnani | 715/781 |
| 2010/0107172 A1 * | 4/2010 | Calinescu et al. | 718/104 |
| 2010/0214090 A1 * | 8/2010 | Sartini et al. | 340/517 |

* cited by examiner

*Primary Examiner* — Matt Kim
*Assistant Examiner* — Tuan S Nguyen
(74) *Attorney, Agent, or Firm* — Jetter & Associates, P.A.

(57) ABSTRACT

A method, system and computer program product for coordinating the data update rate for a shared resource amongst multiple, different and independently executing computing applications. A method coordinates the data update rate for a shared monitored resource amongst multiple, different and independently executing monitoring applications. The method can include detecting a toggling active of a fast mode user interface control disposed in a window of a corresponding monitoring application. The method also can include the activation in response to the detection, of a fast mode of data acquisition for the shared monitored resource. Finally, in response to the detection, other monitoring applications can be messaged to deactivate a fast mode of data acquisition for the shared monitored resource.

13 Claims, 2 Drawing Sheets

MULTIPLE APPLICATION COORDINATION OF THE DATA UPDATE RATE FOR A SHARED RESOURCE

FIELD

Disclosed embodiments relate to controlling the data update rate for a shared resource and more particularly to coordinating the control of the data update rate for a shared resource amongst multiple, different and independently executing computing applications.

BACKGROUND

Resource monitoring has formed part and parcel of the modern computer driven control system. The modern computer driven control system includes a multiplicity of different sensors and sub-systems independently operating in concert to achieve an end result such as the production of a product. Data generated by the sensors in response to sensed conditions can be passed to the sub-systems for use in command and control decision-making, whether automated or manual. The sub-systems, in turn can produce additional data not only in respect to environmental conditions sensed by the sensors, but also in respect to the performance of the sub-systems. Of course, different sub-systems can share sensed data amongst each other in parallel or sequence depending upon the architecture of the control system.

Integral to managing a control system of multiple different sub-systems is the timely receipt of monitored data from different resources in each of the sub-systems. The more quickly monitored data can be received by a monitoring application, the more quickly the monitored data—whether raw or in reduced form—can be presented to an operator for command and control decision making. Accordingly, oftentimes, a "fast mode" can be provided through a monitoring application in response to the activation of which monitored data in the monitoring application can be updated at a faster rate. Yet, at times when a faster data-update rate is not required, the "fast mode" can be de-activated. So popular has the "fast mode" become in the modern control system architecture, some sub-system keyboards now include a hardware switch onboard to toggle the activation and de-activation of a "fast mode" for a monitored resource.

In an architecture where a single application monitors a set of monitored resources amongst the different sub-systems, the rate at which the monitored data depends solely on the speed at which the application can receive and process the monitored data. However, where multiple different and independently operating applications monitor the same monitored resource shared amongst the multiple different independently operating applications, the data rate of delivery of monitored data to different ones of the monitoring applications can depend on the processing ability of the shared resource to deliver the monitored data to the different monitoring applications. To the extent that too many monitoring applications request a high rate of data delivery of monitored data at once, the shared resource can become overtaxed requiring a reduction in data rate for the delivery of monitored data over all. Yet, serving monitored data at too slow a data rate can inhibit the timely delivery of the monitored data to a monitoring application thus defeating the ability of an operator to effectively respond to the late arriving monitored data.

SUMMARY

Embodiments of the invention address deficiencies of the art in respect to managing the data update rate of a shared monitored resource and provide a method, system and computer program product for coordinating the data update rate for a shared resource amongst multiple, different and independently executing computing applications. In an embodiment of the invention, a method is provided for the coordination of the data update rate for a shared monitored resource amongst multiple, different and independently executing monitoring applications. The method can include detecting a toggling active of a fast mode user interface control disposed in a window of a corresponding monitoring application. The method also can include the activation in response to the detection, of a fast mode of data acquisition for the shared monitored resource. Finally, in response to the detection, other monitoring applications can be messaged to deactivate a fast mode of data acquisition for the shared monitored resource.

In another embodiment of the invention, a data processing system can be provided to include a computer with at least one processor and memory and an operating system executing in the memory of the computer. The system also can include multiple different monitoring applications hosted by the operating system. Each of the monitoring applications can provide a different window in a display of the computer and each of the monitoring applications can receive data from a shared monitored resource communicatively linked to the computer. Multiple different instances of fast mode coordination logic can be included with the system. Each instance can be coupled to a corresponding one of the monitoring applications.

The logic can include program code enabled to detect a toggling active of a fast mode user interface control disposed in a window of a corresponding monitoring application, and to activate, in response to the detection, a fast mode of data acquisition for the shared monitored resource. The program code further can be enabled in response to the detection, to message others of the monitoring applications that monitor the shared monitored resource to deactivate a fast mode of data acquisition for the shared monitored resource. Optionally, the system also can include a keyboard for a monitoring computer terminal of the shared monitored resource, and a visual indicator on the keyboard illuminable in response to receiving a directive from the fast mode coordination logic to illuminate.

Additional aspects of this disclosure will be set forth in part in the description which follows, and in part will be obvious from the description, or may be learned by practice of the subject matter disclosed herein. The aspects of this disclosure will be realized and attained by means of the elements and combinations particularly pointed out in the appended claims. It is to be understood that both the foregoing general description and the following detailed description are exemplary and explanatory only and are not restrictive of this disclosure.

BRIEF DESCRIPTION OF THE DRAWINGS

The accompanying drawings, which are incorporated in and constitute part of this specification, illustrate embodiments of the invention and together with the description, serve to explain the principles disclosed herein. The embodiments illustrated herein are exemplary, it being understood, however, that this disclosure is not limited to the precise arrangements and instrumentalities shown, wherein.

DETAILED DESCRIPTION OF THE INVENTION

Disclosed embodiments provide for a method, data processing system and computer program product for coordinating the data update rate for a shared resource amongst multiple, different and independently executing computing applications. In accordance with an embodiment of the invention, a selection of a user interface component of an active window of a monitoring application executing in memory of a computer can be detected and identified as a toggling of a fast mode for updating data from a shared monitored resource. In response to detecting the toggling of the user interface component to direct activation of the fast mode for the shared monitored resource, a fast mode can be activated for the shared monitored resource with respect to the active window of the monitoring application. Further, other monitoring applications monitoring the shared monitored resource can be messaged each to deactivate a corresponding fast mode for updating data from the shared monitored resource. Optionally, a visual indicator on a keyboard coupled to the computer can be illuminated to indicate the activation of the fast mode. In this way, the use of the fast mode can be coordinated to benefit the active window of the monitoring application without overburdening the shared monitored resource.

Figure 1:
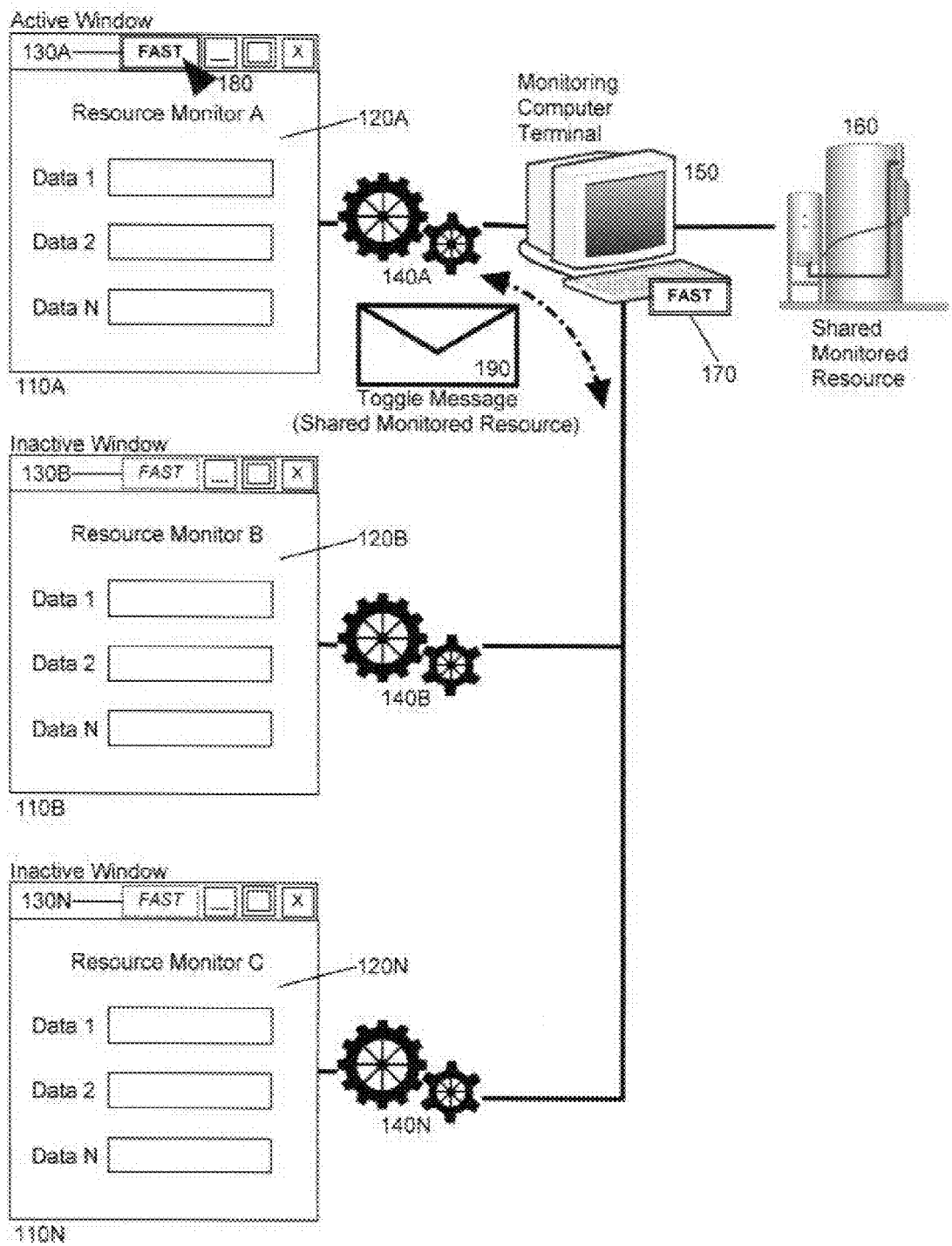
FIG. 1 is a pictorial illustration of a process for coordinating the data update rate for a shared resource amongst multiple, different and independently executing computing applications, according to an embodiment of the invention.

In illustration, FIG. 1 pictorially shows a process for coordinating the data update rate for a shared resource amongst multiple, different and independently executing computing applications. As shown in FIG. 1, a monitoring computer terminal 150 can be coupled to a shared monitored resource 160 such as a sub-system of a control system. The monitoring computer terminal 150 can be a computer with at least one processor and memory. The monitoring computer terminal 150 also can include a keyboard for keyboard input. Of note, the monitoring computer terminal 150 can direct the activation of a fast mode for high-speed data acquisition from the shared monitored resource 160. To that end, an indicator such as a visual lighted element 170 on the keyboard can be illuminated when the fast mode has been activated for the shared monitored resource 160.

Multiple different monitoring applications 110A, 110B, 110N can execute in the memory of the monitoring computer terminal 150 by at least one processor of the monitoring computer terminal 150. Each of the multiple different monitoring applications 110A, 110B, 110N can execute independently of one another and can include a corresponding window displayed in the monitoring computer terminal 150. In this regard, as it will be understood, one of the windows of a corresponding one of the multiple different monitoring applications 110A can be active whilst others of the windows of corresponding ones of the multiple different monitoring applications 110B, 110N can be inactive. In all instances, however, each of the multiple different monitoring applications 110A, 110B, 110N can collect and display data in a data display area 120A, 120B, 120N acquired from the shared monitored resource 160, whether in raw or reduced form.

Coordination logic 140A, 140B, 140N can be coupled to corresponding ones of the multiple different monitoring applications 110A, 110B, 110N. The coordination logic 140A, 140B, 140N can include program code enabled to trap events in respective ones of the windows of corresponding ones of the multiple different monitoring applications 110A, 110B, 110N. The program code of the coordination logic 140A, 140B, 140N further to determine whether or not a fast mode user interface control 130A, 130B, 130N has been selected for toggling active by user interface selection tool 180 such as a mouse pointer. The program code of the coordination logic 140A, 140B, 140N yet further can be enabled, in response to detecting the toggling of the fast mode user interface control 130A, 130B, 130N on a corresponding one of the multiple different monitoring applications 110A, 110B, 110N, to direct activation of the fast mode for the shared monitored resource 160 with respect to the corresponding one of the multiple different monitoring applications 110A, 110B, 110N.

Also, the program code of the coordination logic 140A, 140B, 140N can be enabled, in response to detecting the toggling of the fast mode user interface control 130A, 130B, 130N on a corresponding one of the multiple different monitoring applications 110A, 110B, 110N, to transmit a message 190 to other ones of the multiple different monitoring applications 110A, 110B, 110N to deactivate a corresponding fast mode for updating data from the shared monitored resource 160. Optionally, the program code of the coordination logic 140A, 140B, 140N can be enabled, in response to detecting the toggling of the fast mode user interface control 130A, 130B, 130N on a corresponding one of the multiple different monitoring applications 110A, 110B, 110N, to illuminate the visual lighted element 170 on the keyboard of the monitoring computer terminal 150. In this way, the toggling active of any of the fast mode user interface controls 130A, 130B, 130N can be coordinated with the toggling inactive of the others of the fast mode user interface controls 130A, 130B, 130N to avoid overburdening the shared monitored resource 160.

Figure 2:
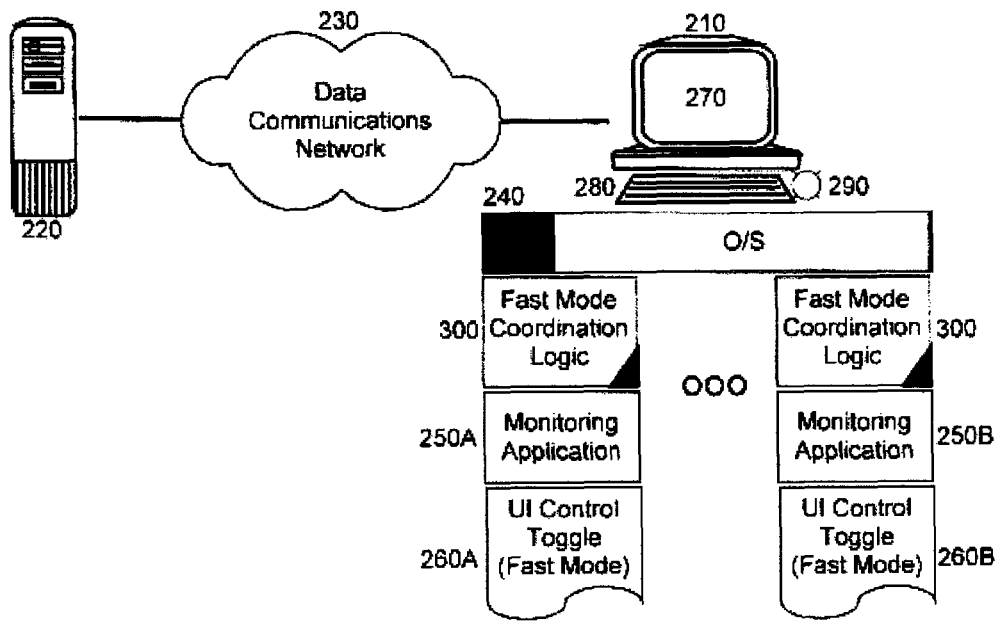
FIG. 2 is a schematic illustration of a data processing system configured for coordinating the data update rate for a shared resource amongst multiple, different and independently executing computing applications, according to an embodiment of the invention.

The process described in connection with FIG. 1 can be implemented within a data processing system managing a control system of sub-systems including at least one shared monitored resource. In further illustration, FIG. 2 schematically shows a data processing system configured for coordinating the data update rate for a shared resource amongst multiple, different and independently executing computing applications. The system can include a computer 210 with at least one processor and memory communicatively linked to at least one shared monitored resource 220 (such as a remote computing resource) over data communications network 230. In this regard, the data communications network 230 can include a direct link over a serial or parallel communications bus, a wireless connection, or a remote link through one or more switches and/or routers utilizing interprocess communications, to name only a few examples.

The computer 210 also can include a display 270 and a keyboard 280 with a coupled visual indicator 290 that when illuminated, indicates a fast mode of data acquisition from the shared monitored resource 220 to a monitoring application 250A, 250B executing in memory by at least one processor of the computer 210 through the operating system 240 also executing in memory by at least one processor of the computer 210. Notably, each monitoring application 250A, 250B can include a fast mode user interface control toggle 260A, 260B respectively disposed in a window (not shown) for a user interface of a corresponding monitoring application 250A, 250B. Further, fast mode coordination logic 300 can be coupled individually to each of the monitoring applications 250A, 250B.

The fast mode coordination logic 300 can subclass the respective windows of corresponding ones of the monitoring applications 250A, 250B and can include program code enabled to trap events in the respective windows. The program code of the fast mode coordination logic 300 further can be enabled to determine whether or not a fast mode user interface control toggle 260A, 260B has been selected for toggling active. The program code of the fast mode coordination logic 300 yet further can be enabled, in response to detecting the toggling active of the fast mode user interface control toggle 260A, 260B on a corresponding one of the monitoring applications 250A, 250B, to direct activation of the fast mode for the shared monitored resource 220 with respect to the corresponding one of the monitoring applications 250A, 250B.

Also, the program code of the coordination logic 300 can be enabled, in response to detecting the toggling of the fast mode user interface control 260A, 260B on a corresponding one of the monitoring applications 250A, 250B, to transmit a message to others of the monitoring applications 250A, 250B to deactivate a corresponding fast mode for updating data from the shared monitored resource 220. Optionally, the program code of the coordination logic 300 can be enabled, in response to detecting the toggling of the fast mode user interface control 260A, 260B on a corresponding one of the monitoring applications 250A, 250B, to illuminate the visual indicator 290 on the keyboard 280 of the computer 210. In this way, the toggling active of any of the fast mode user interface controls 260A, 260B can be coordinated with the toggling inactive of the others of the fast mode user interface controls 260A, 260B to avoid overburdening the shared monitored resource 220.

Figure 3:
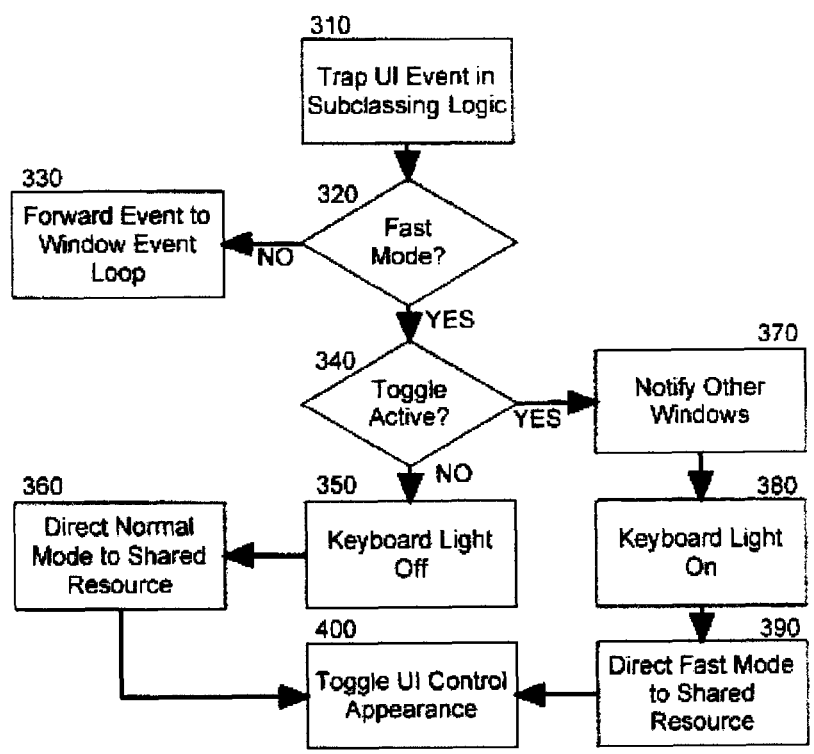
FIG. 3 is a flow chart illustrating a process for coordinating the data update rate for a shared resource amongst multiple, different and independently executing computing applications, according to another embodiment of the invention.

In even yet further illustration of the operation of the fast mode coordination logic 300, FIG. 3 is a flow chart illustrating a process for coordinating the data update rate for a shared monitored resource amongst multiple, different and independently executing computing applications. Beginning in block 310, a user interface event for a window of a corresponding monitoring application can be trapped and pre-processed prior to forwarding to the window. In particular, in decision block 320 it can be determined at the outset whether or not the trapped event pertains to the toggling active or inactive of a user interface control for the fast mode for a shared monitored resource. If not, in block 330, the event can be passed on to the parent event loop for the window. Otherwise, in block 340, it can be determined whether the event indicates an attempt to toggle a fast mode user interface control active or inactive.

If the latter, then in block 350 the keyboard for a monitoring computer terminal can be directed to de-illuminate a visual indicator light for the fast mode. Additionally, in block 360 a normal mode of data acquisition can be established with the shared resource with respect to the corresponding monitoring application. However, if the former, in block 370 a message can be sent to other windows for others of the monitoring applications to de-activate a corresponding fast mode of data acquisition from the shared monitored resource. Also, in block 380 the keyboard for a monitoring computer terminal can be directed to illuminate a visual indicator light for the fast mode. Additionally, in block 390 a fast mode of data acquisition can be established with the shared resource with respect to the corresponding monitoring application. Finally, in block 400 the appearance of the user interface control for the fast mode for the shared monitored resource can be toggled in appearance to reflect a current state of the fast mode for the corresponding monitoring application.

It is to be appreciated that while the foregoing detailed description pertains to the coordination of the data update rate for a shared resource, the same aspects described above can also be applied to the coordination of a flow rate for fluid flow in a physical system. In an alternative embodiment, one computing application can direct the increased flow of a fluid in a fluid conduit (e.g., by directing an enhanced apportionment of pump output from a pump) to the exclusion of other computing applications controlling fluid flow using the same pump.

As will be appreciated by one skilled in the art, aspects disclosed herein may be embodied as a system, method or computer program product. Accordingly, aspects of this disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of this disclosure may take the form of a computer program product embodied in one or more computer readable storage medium(s) having computer readable program code embodied thereon.

Aspects of this disclosure have been described above with reference to flowchart illustrations and/or block diagrams of methods, apparatus (systems) and computer program products according to embodiments of the invention. In this regard, the flowchart and block diagrams in the figures illustrate the architecture, functionality, and operation of possible implementations of systems, methods and computer program products according to various embodiments of the invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description herein has been presented for purposes of illustration and description, but is not intended to be exhaustive or limited to the form disclosed. Many modifications and variations will be apparent to those of ordinary skill in the art without departing from the scope and spirit of this disclosure. The embodiment was chosen and described in order to best explain the principles of the invention and the practical application, and to enable others of ordinary skill in the art to understand this disclosure for various embodiments with various modifications as are suited to the particular use contemplated.

Having thus described this disclosure in detail and by reference to embodiments thereof, it will be apparent that modifications and variations are possible without departing from the scope of this disclosure defined in the appended claims as follows:

I claim:

1. A method for coordinating the data update rate for a shared monitored sensed data resource amongst a plurality of different and independently executing monitoring applications, the method comprising:
    providing a computer having at least one processor, said processor_running the plurality of monitoring applications which provide a toggling active input of a fast mode user interface control, the toggling active input dynamically choosing a selected one of the plurality of monitoring applications to receive the shared monitored sensed data resource;
    detecting the toggling active input the fast mode user interface control disposed in a window in a display of the computer corresponding to the selected one of the plurality of monitoring applications, and
    responsive to the detecting, activating a fast mode of data acquisition exclusively for the selected one of the plurality of monitoring applications to receive the shared monitored sensed data resource and;
    automatic messaging others of the plurality of monitoring applications monitoring the shared monitored sensed data resource,
    wherein responsive to receipt of the automatic messaging the others of the plurality of monitoring applications each deactivate a fast mode of data acquisition for the shared monitored sensed data resource.

2. The method of claim 1, further comprising directing an illumination of a visual indicator on a keyboard for a monitoring computer terminal of the shared monitored sensed data resource in response to the detection.

3. The method of claim 1, wherein said detecting the toggling active input of the fast mode user interface control, comprises:
    subclassing the window;
    trapping an event in the window, and
    determining the event to indicate a toggling active of the fast mode user interface control disposed in the window.

4. The method of claim 1, further comprising toggling an appearance of the fast mode user interface control to an active appearance in response to the detection.

5. The method of claim 1, further comprising:
    receiving a message from a different one of the others of the plurality of monitoring applications to deactivate a fast mode of data acquisition for the shared monitored sensed data resource, and
    responsive to the receipt of the message, deactivating the fast mode of data acquisition for the shared resource and toggling an appearance of the fast mode user interface control to an inactive appearance.

6. A data processing system comprising:
    a computer with at least one processor and memory;
    an operating system executing in the memory of the computer;
    a plurality of different monitoring applications hosted by the operating system, each of the monitoring applications providing a different window in a display of the computer and each of the monitoring applications receiving data from a shared monitored sensed data resource communicatively linked to the computer, and
    a plurality of instances of fast mode coordination logic, each instance being coupled to a corresponding one of the plurality of monitoring applications, the logic comprising program code enabled to detect a toggling active input of a fast mode user interface control disposed in a window corresponding to a selected one of the plurality of monitoring application, the toggling active input dynamically choosing the selected one of the plurality of monitoring applications to receive the shared monitored sensed data resource; and to activate in response to the detection, a fast mode of data acquisition exclusively for the selected one of the plurality of monitoring applications to receive the shared monitored sensed data resource and to automatically message in response to the detection wherein responsive to receipt of the automatic messaging the others of the plurality of monitoring applications monitoring the shared monitored sensed data resource to each deactivate a fast mode of data acquisition for the shared monitored sensed data resource.

7. The system of claim 6, further comprising:
    a keyboard for a monitoring computer terminal of the shared monitored sensed data resource, and
    a visual indicator on the keyboard illuminable in response to receiving a directive from the fast mode coordination logic to illuminate.

8. The system of claim 6, wherein each instance of the fast mode coordination logic subclasses a corresponding window for a monitoring application.

9. A computer program product comprising:
    a non-transitory computer readable storage medium embodying computer usable program code for coordinating the data update rate for a shared monitored sensed data resource amongst a plurality of different and independently executing monitoring applications, the computer program product comprising:

computer usable program code for detecting a toggling active input of a fast mode user interface control disposed in a window corresponding to a selected one of the plurality of monitoring application executing in memory by at least one process or a computer, the toggling active input dynamically choosing the selected one of the plurality of monitoring applications to receive the shared monitored sensed data resource, and computer usable program code for activating responsive to the detection, a fast mode of data acquisition exclusively for the selected one of the plurality of monitoring applications to receive the shared monitored sensed data resource and for automatically messaging others of the plurality of monitoring applications monitoring the shared monitored sensed data resource to each deactivate a fast mode of data acquisition for the shared monitored sensed data resource.

10. The computer program product of claim 9, further comprising computer usable program code for directing an illumination of a visual indicator on a keyboard for a monitoring computer terminal of the shared monitored sensed data resource in response to the detection.

11. The computer program product of claim 9, wherein the computer usable program code for detecting the toggling active input of a fast mode user interface control, comprises:

computer usable program code for subclassing the window;

computer usable program code for trapping an event in the window, and computer usable program code for determining the event to indicate a toggling active of the fast mode user interface control disposed in the window.

12. The computer program product of claim 9, further comprising computer usable program code for toggling an appearance of the fast mode user interface control to an active appearance in response to the detection.

13. The computer program product of claim 9, further comprising:

computer usable program code for receiving a message from a different one of the others of the plurality monitoring applications to deactivate a fast mode of data acquisition for the shared monitored sensed data resource, and computer usable program code for deactivating, responsive to the receipt of the message, the fast mode of data acquisition for the shared resource and toggling an appearance of the fast mode user interface control to an inactive appearance.

* * * * *